United States Patent

[11] 3,597,612

| [72] | Inventor | Leo R. Boyd<br>San Jose, Calif. |
|---|---|---|
| [21] | Appl. No. | 793,944 |
| [22] | Filed | Jan. 27, 1969 |
| [45] | Patented | Aug. 3, 1971 |
| [73] | Assignee | The United States of America as represented by the United States Atomic Energy Commission |

[54] POWER-PULSE MONITORING PROBE
8 Claims, 10 Drawing Figs.

[52] U.S. Cl. .................................................. 250/83.1,
250/83.3 R
[51] Int. Cl. ....................................................... G01t 3/04
[50] Field of Search ........................................... 250/83.1,
83.3, 108; 176/68

[56] References Cited
UNITED STATES PATENTS

| 2,856,341 | 10/1958 | Kanne | 176/68 |
| 3,132,077 | 5/1964 | Turovlin | 176/68 |
| 3,444,373 | 5/1969 | Obrowski et al. | 250/83.1 |

*Primary Examiner* — James W. Lawrence
*Assistant Examiner* — Morton J. Frome
*Attorney* — Roland A. Anderson ABSTRACT: An apparatus for monitoring total energy variations in a nuclear reactor and comprises, in one embodiment, a heat sink, a mass of fissionable material in thermal contact with said heat sink and a thermocouple in electrical and thermal contact with said mass of fissionable material. In order to compensate for gamma radiation a further improvement is provided in another embodiment by adding a mass of material having the same gamma absorption characteristics as said mass of fissional material, said gamma absorbing material being electrically insulated from said heat sink, and a second thermocouple in electrical and thermal contact with said gamma absorbing material and in electrical series opposing connection with said first thermocouple. The disclosed device is used to measure the transient power variations and evaluate the Doppler effect for controlling reactor stability, or to measure transient power variation in fast or thermal reactors to obtain data for monitoring the reactor operation.

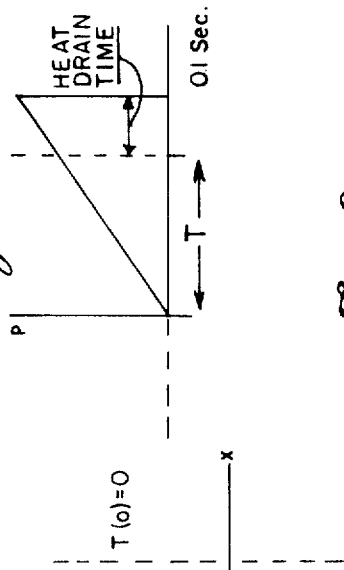
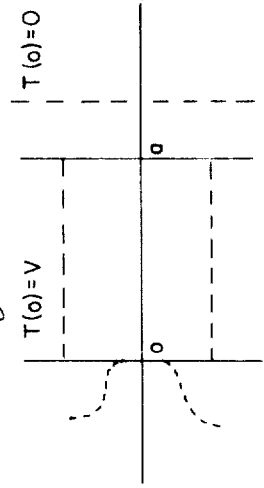
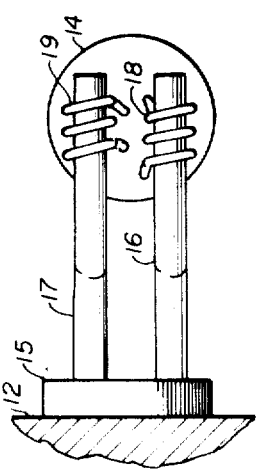
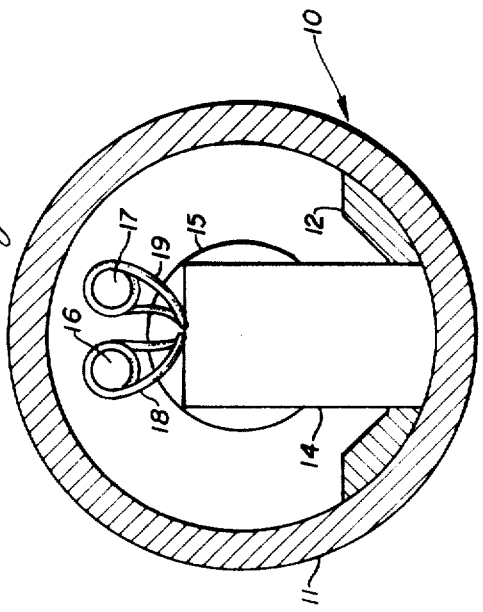
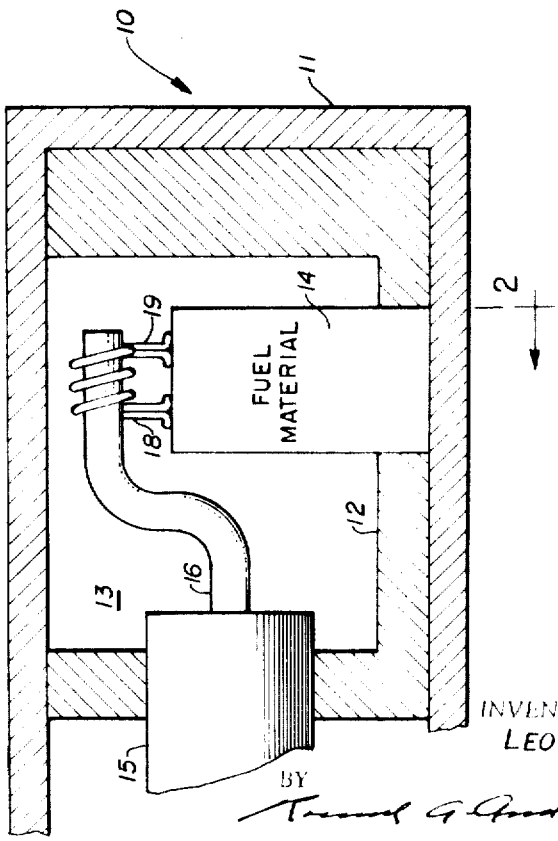

INVENTOR.
LEO R BOYD

BY
ATTORNEY

POWER-PULSE MONITORING PROBE

BACKGROUND OF THE INVENTION

The invention described herein was made in the course of, or under, Contract No. AT(04-3)-540, with the U.S. Atomic Energy Commission.

This invention relates generally to measuring apparatus for use in connection with the operation of nuclear reactors, and more particularly to apparatus to sense the integrated powers generated in fuel-bearing material during a power excursion in a nuclear reactor.

Much prior effort has been directed to various types of measuring apparatus for use in the operation of nuclear reactors, as exemplified by U.S. Pat. No. 2,856,341 to Kanne and U.S. Pat. No. 2,997,589 to Mims which disclose a mass of fissionable material in electrical and thermal contact with a thermocouple for measuring fuel-element temperature in a reactor, the readout of which is utilized in reactor operation control.

SUMMARY OF THE INVENTION

The detector or energy probe of the present invention monitors reactor power pulses which are superimposed on a steady-state power level. The change in the voltage output is proportional to the instantaneous total energy liberated in a piece of fuel by the neutron flux pulse.

The instant device consists basically of a thermocouple junction mounted on a small column of fuel material, the base of which is thermally ground to the reactor coolant, which may be liquid sodium, for example. The thermocouple wires are mounted on the end of the fuel piece opposite to the thermally grounded end, and are separately joined to minimize the perturbation of the junction temperatures.

Thus, the present invention provides the following advantages: (1) mounting the fuel piece in contact with a heat sink so that the device can be used to measure the instantaneous total energy of pulses superimposed on a steady-state power level without incurring an excessive temperature rise in the fuel piece, and (2) utilizing dimensions such that the heat drain from the region of the thermocouple junctions during the course of a short power pulse is negligible.

Therefore, it is an object of this invention to provide a device that monitors nuclear reactor power pulses.

A further object of the invention is to provide a device to sense the integrated powers generated in fuel-bearing material during a power excursion in a nuclear reactor.

Another object of the invention is to provide a total-energy probe wherein a fuel piece is mounted in thermal contact with a heat sink so that the probe can be used to measure the instantaneous total energy of pulses superimposed on a steady-state power level without incurring an excessive temperature rise in the fuel piece, and constructed such that the heat drain from the region of the thermocouple junctions mounted thereon, during the course of a short power pulse, within acceptable limits.

Other objects of the invention will become readily apparent from the following description and accompanying drawings wherein:

BRIEF DESCRIPTION OF THE DRAWINGS

FIG. 1 is a side view, partially in cross section, of an embodiment of the invention;

FIG. 2 is a view partially in cross section of the FIG. 1 embodiment taken on the line 2-2 thereof;

FIG. 3 is a top view of the FIG. 1 embodiment with the housing and heat sink removed;

FIG. 7 illustrates a mathematical model for investigating the effect of the base on the TC junctions;

FIG. 8 is a graph of a sawtooth power pulse illustrating the time of heat drain;

DESCRIPTION OF THE INVENTION

Figure 9:
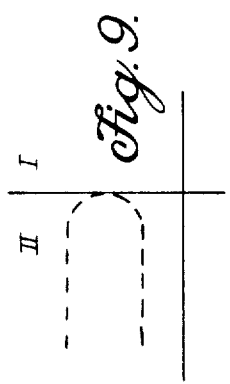
FIG. 9 illustrates a mathematical model of the TC junction interface.

Conceptually, the energy probe of this invention is a transducer to sense the rise in temperature of fuel-bearing material due to a power excursion in a nuclear reactor. This device serves as a useful supplement to that instrumentation conventionally used in nuclear reactors. The present invention has particular utility in the testing to demonstrate that the Doppler effect will prevent serious reactor core damage due to induced power excursions in fast sodium reactors, as being carried out, for example, in the Southwest Experimental Fast Oxide Reactor (SEFOR), wherein the probe is used to measure the transient power variations and evaluate the Doppler effect for controlling reactor stability.

As the temperature of the fuel rises in a power excursion, the fission cross section of U-238 decreases relative to its absorption cross section with a consequent decrease in reactor reactivity. The change is caused by the Doppler effect, the broadening of resonance neutron absorption peaks for both radiative capture and fission, which in the case of U-238, results in a relative decrease in fission absorption and consequently in reactor reactivity. The net effect is relatively small or zero in the case of Pu-239 and of U-235. Thus, for example, the SEFOR reactor kinetics are such that the total energy liberated in the fuel during a power excursion will not jeopardize the safety of the plant.

The power excursion during Doppler coefficient tests have, in the past, been monitored by known instrumentation in various ways. However, as pointed out above, additional instrumentation was needed to give the following results:

1. To give a full range, instantaneous, in-core measurement of power pulse profits.
2. To supplement present pulse-monitoring instrumentation by cross comparison of its results with that from an alternate system.
3. To provide a knowledge of in-core spatial dependence of the Doppler effect, by distribution of detectors throughout the core.

The present invention serves to accomplish substantially all of these desired results.

It has been found that, the time-integrated power or cumulative energy per of fuel material in the probe, $E_1(t)$, can be obtained from its instantaneous temperature as follows:

$$E_1(t) = \int_{v_{1i}}^{v_1(t)} C_{p1} dT$$

where: $v_1(t)$ = instantaneous unperturbed temperatures of probe fuel material.

$C_{p1}$ = specific heat of fuel material (a function of temperature, $T$).

$v_{1i}$ = initial (prepulse) temperature of probe fuel material.

To derive the instantaneous integrated power per g. of reactor fuel, $E_0(t)$, directly from that in the fuel material where they differ in type, the relative macroscopic fission cross sections are needed.

If it is assumed that the ratio of the macroscopic cross section of the probe fuel and reactor fuel materials are strictly proportional during a pulse, then:

$$E_0(t) = \frac{\Sigma f_0}{\Sigma f_1} E_1(t) \quad A \int_{v_{1i}}^{v_1(t)} C_{p1} dT$$

where: $E_o(t)$ = instantaneous power of probe fuel material.
$\Sigma fo$ = macroscopic fission cross section/g. of reactor fuel.
$\Sigma fi$ = macroscopic fission cross section/g. of probe fuel material.
and where:
$E_1(t)$ = instantaneous integrated power of probe fuel material.
$A = \Sigma fo/\Sigma fi$
$v_1(t)$ = instantaneous unperturbed temperature of probe fuel material.
$C_{p1}$ = specific heat of probe-fuel material.
$v_{i1}$ = initial (prepulse) temperature of probe-fuel material.

The instantaneous reactor fuel temperature at a given probe position in the reactor can be determined as follows:

$$E_0(t) = \int_{r_{i0}}^{r_0(t)} C_{p0} dT = A \int_{r_{i1}}^{r_1(t)} C_{p0} dT$$

where: $E_o(t)$ = instantaneous integrated power of probe fuel material.
$v_o(t)$ = instantaneous unperturbed temperature of reactor fuel material.
$C_{po}$ = specific heat of reactor fuel material (function of temperature).
$v_{io}$ = initial (prepulse) temperature of reactor fuel material.

$A = \dfrac{\Sigma fo}{\Sigma fi}$ = macroscopic fission cross section/gm. of reactor fuel.
= macroscopic fission cross section/gm. of probe fuel material.

$v_1(t)$ = instantaneous unperturbed temperatures of probe fuel material.
$C_{p1}$ = specific heat of probe fuel material (function of temperature).
$v_{i1}$ = initial (prepulse) temperature of probe fuel material.

If both $C_{po}$ and $C_{p1}$ were considered to be constant, the above expression could be written as follows:

$$C_{po}[v_{fo}-v_{io}] = A C_{p1}[v_{f1}-v_{i1}]$$

or:
$$v_{fo} - v_{io} = A \dfrac{C_{p1}}{C_{po}}[v_{f1} - v_{i1}]$$

or:
$$\dfrac{\Delta V_{fo}}{\Delta V_{f1}} = A \dfrac{C_{p1}}{C_{po}}$$

where: $C_{po}$ = specific heat of reactor fuel material.
$v_{fo}$ = final (postpulse) temperature of reactor fuel material.
$v_{io}$ = initial (prepulse) temperature of reactor fuel material.

$A = \dfrac{\Sigma fo}{\Sigma fi}$ = macroscopic fission cross section/gm. of reactor fuel.
= macroscopic fission cross section/gm. of probe fuel material.

$C_{p1}$ = specific heat of probe fuel material.
$v_{f1}$ = final (postpulse) temperature of probe fuel material.
$v_{i1}$ = initial (prepulse) temperature of probe fuel material.
$\Delta V_{fo}$ = unperturbed temperature rise of probe fuel material during power pulse.
$\Delta V_{f1}$ = unperturbed temperature rise of probe fuel material during power pulse.

The instantaneous temperature of the reactor fuel, $v_o(t)$, can then be calculated as follows:

$$v_0(t) = \dfrac{\Delta V_{fo}}{\Delta V_{f1}}[v_1(t) - v_{i1}] + v_{io}$$

where: $\Delta V_{fo}$ = unperturbed temperature rise of reactor fuel during power pulse.
$\Delta V_{f1}$ = unperturbed temperature rise of probe fuel material during power pulse.
$v_1(t)$ = instantaneous unperturbed temperatures of probe fuel material.

$v_{i1}$ = initial (prepulse) temperature of probe fuel material.
$v_{io}$ = initial (prepulse) temperature of reactor fuel material.

The estimated errors in the various factors are given below:

$$V_{fo} \pm 3\% \; [v_1(t) - v_{i1}] : 1\%$$

$$V_{f1} \pm 2\% \; v_{io} \pm 3\%$$

If the error factors are assumed to be error limits, a linear propagation of error (maximum error) would be obtained from the following:

$$\text{Maximum error} = \dfrac{1.03}{.98}[1.01] + .03 = 1.09$$

or approximately 9 percent.

The above accuracy has been corroborated by tests utilizing other types of apparatus. Agreement within ±10 percent was obtained between the output of the probe, that of other instruments, and results of activation analysis. For experimental determination of spatial dependence of the Doppler effect, only the ratio of energy deposition in different probes would be needed; hence, only temperature indication errors affect this measurement.

A first embodiment of the inventive energy probe is illustrated in FIGS. 1—3 and generally indicated at 10. Energy probe 10 comprises a housing 11 of stainless steel, for example, or other material compatible with the reactor coolant; a heat sink or mount 12 fixedly secured in housing 11 by means not shown and forming a cavity or chamber 13 within housing 11, heat sink 12 may be constructed, for example, from common steel, copper or other good heat conductive material; a small block of metal fuel material 14 positioned in cavity 13 and in good thermal contact with heat sink 12 and housing 11, the fuel material 14 being compatible with the fuel that utilized in the associated fuel rods in the reactor core; a thermocouple cable 15 extending through mount or heat sink 12 into cavity 13 and containing a pair of conductors 16 and 17 positioned in a spaced relation to fuel material 14; and a pair of thermocouple (TC) wires or leads 18 and 19 wrapped respectively on conductors 16 and 17, the ends of wires 16 and 17 being positioned in good thermal contact with the block of fuel material 14.

During operation, the housing 11 is immersed in the reactor coolant, which, for example, may be liquid sodium, and thus mount or heat sink 12 as well as housing 11 are essentially at the temperature of the reactor coolant. When the TC wires 18 and 19 are mounted individually on the material to be monitored, the junction is often referred to as an "intrinsic junction." The diameter of the thermocouple (TC) wires 18 and 19 and the height of the fuel material block 14 are such as to make heat leakage away from the junction negligible during the short time of the power transients in the reactor. Mounting of the probe fuel material 14 on heat sink 12 is needed to limit steady-state temperature rise since the reactor occasionally will be at full power before the pulse, and usually at greater than full power after the pulse. The thermocouple cable 15 is firmly attached to heat sink 12 or to another fixed support member. The relatively delicate TC wires 18 and 19 can thus be manipulated on conductors 16 and 17 and fuel material 14 without being subjected to undue stress since they need only to support their own weight. It may be advantageous to have many positive and many negative TC wires in parallel to achieve some degree of redundancy and reduce the possibility of circuit interruption due to wire breakage.

Figure 6:
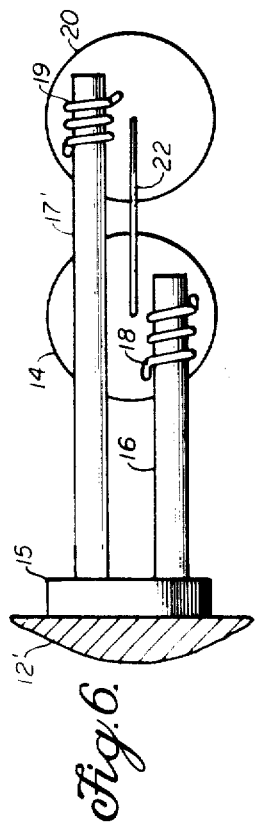
FIG. 6 is a top view of the FIG. 4 embodiment without the housing and heat sink.
Figure 5:
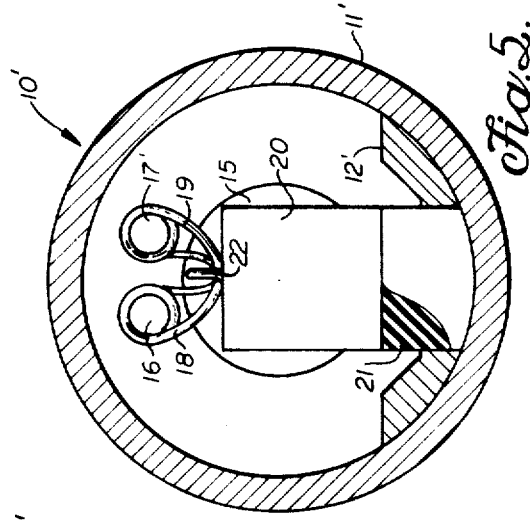
FIG. 5 is a view, partially in cross section, of the FIG. 4 embodiment taken on the line 5-5 of FIG. 4.
Figure 4:
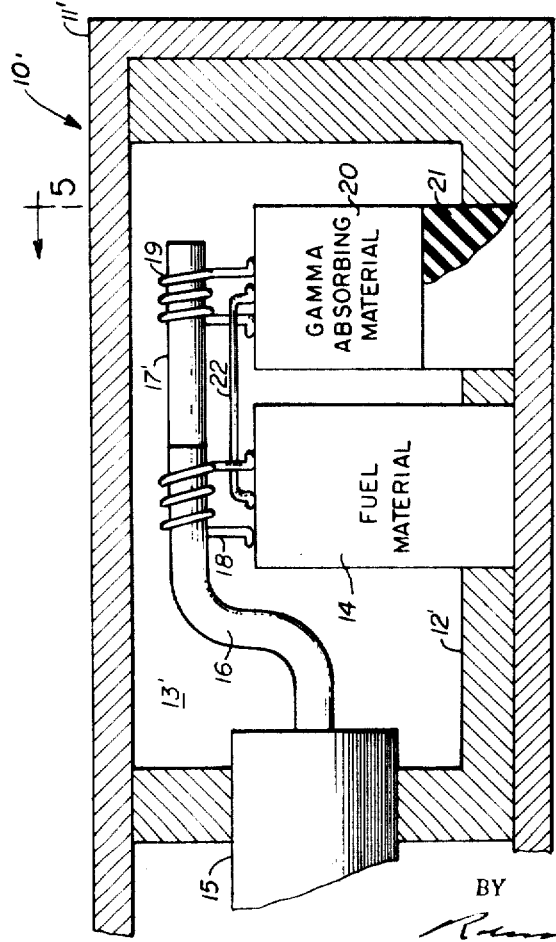
FIG. 4 is a side view, partially in cross section, of another embodiment of the invention which incorporates means to compensate for gamma radiation.

For some purposes, only power due to fission heating may be of interest. In this case, a second mass containing no fissionable material and, thus, only heated by gamma flux, can be included as shown in the FIGS. 4—6 embodiment of an energy probe indicated generally at 10'. This embodiment differs from the FIGS. 1—3 embodiment by lengthening housing 11', heat sink 12' and cavity 13', an inserting between fuel material block 14 and the forward end of the housing 11', a block of gamma radiation absorbing material 20 mounted on an electrical insulator 21. In addition, the thermocouple cable conductor 17' is lengthened to extend over the upper end of gamma absorbing material 20 such that TC wire 19 is in good thermal contact with the block of material 20. An intrinsic junction in series opposing that on the fuel piece 14 is mounted on this second mass or block 20 to eliminate the gamma contribution from the signal, this being accomplished by the wire or lead 22 interconnecting blocks 14 and 20. The block of gamma radiation absorbing material 20 must be equivalent to the fuel material block 14 in regard to gamma mass absorption rates and heat capacity. Block 20 must also be electrically isolated from ground, as by insulator 21; otherwise, ground loop circuits would perturb the signal. It is not necessary that the steady-state temperature of material 20 be the same as that of the fuel material 14 since only the transient portion of the signal is of interest.

The composition of the fuel material 14 may, for example, utilize a metallic fuel with only U-235 as the fissionable isotope, or reactor-type fuel having a mixture of plutonium and U-235. However, the former is preferable as will be discussed hereinafter. It should be noted that in early conceptional efforts, a small reactor fuel pellet (mixed oxides) suspended by the thermocouple leads was considered but found ineffective compared to the embodiments described above. Also, in these earlier efforts, the fuel was an oxide with a thin metallic (molybdenum) coating, to which the thermocouple leads were attached.

The temperature indicated with metallic probe fuel is a much better estimate of the unperturbed probe fuel temperature than would be the case with low conductivity oxide fuel since the heat removed by the relatively high conductivity thermocouple leads or wires "see" a larger heat source with metallic fuel. Also, metallic fuel is, from a fabrication standpoint, much superior to oxide. The metal fuel can be machined and is much less likely to fracture under stresses induced by temperature effects and irradiation.

There are several constraints on the probe fuel material chosen. It must be possible to attain good thermal, mechanical, and electrical bonding between the thermocouple leads and the fuel, and between the fuel and the heat sink base of the device. During the course of its irradiation life, it should not fracture or distort to the degree that would mechanically rupture its bonds to the TC leads or the base.

Finally, the probe fuel should not undergo phase changes in the thermal operating range since phase changes would introduce nonlinearities in the temperature vs. total energy relationship due to latent energy change between phases. (At least the degree of phase change during the transient should be negligible.)

One fuel material composition chosen as the probe fuel for this invention is Zr-40 percent U. In the region of Zr-40 percent uranium, the alloy is single phased from about 1,100° F. to 2,000° F. Molybdenum-uranium alloys afford a similar range of operation without phase change. Silicon-uranium undergoes no phase change between room temperature and the 1,800° F. to 2,000° F. range; however, it has not at this time been as thoroughly investigated for use in the probe fuel as the above mentioned alloys. Pure uranium in contrast, undergoes phase changes at 1,229° F. and 1,330° F. which, if they occurred instantaneously, would preclude the use of pure uranium. In these materials, the time required to transform may be a mitigating factor. If the phase changes do not occur in the times of interest, 0.1 sec., then this constraint would be removed.

A stress analysis using a flat-plate approximation with a parabolic temperature distribution through its thickness, indicated that the strain was below the rupture level by a factor of two, but progressive plastic flow due to thermal cycling may limit its mechanical life, this problem being alleviated by alteration of the parameter values.

For obvious reasons of handling convenience and safety, it is desirable to use uranium rather than a mixture of uranium and plutonium isotopes, and can be done without compromising results. While it is true that the Doppler effect does change the fission cross section of the fuel, the magnitude of the change is very small. The maximum reactivity addition during the SEFOR transient tests, for example, are in the range of 1.2 to 1.5 dollars. Since one dollar is equivalent to a 0.0033 change in multiplication coefficient, the Doppler effect must cause a maximum compensating change of only 0.0050 in the fission cross section of the fuel.

Coupled with the above situation is the fact that the flux spectrum remains constant during power transients. As a result, any fissionable isotope can be used in the probe fuel with negligible effect on detector operation. U-235 is a convenient choice for the fissionable isotope since it allows a wide choice of alloys for the required percent by weight of uranium.

The dimension of the fuel material from the TC junction to its base is chosen to be sufficient to isolate the junction from the base for the duration of the power pulses. Let, for example, the temperature perturbation be limited to 1 percent, then a mathematical model, as shown in FIG. 7, in which at $t=c$, the temperature in a semi-infinite system is $V$, where $0 < x \leq a$, and zero everywhere else, with no heat transfer at $x=0$, can be used to investigate the effect of the base on the TC junctions. The $x=0$ plane represents the plane of the TC junctions, and the plane $x=a$ represents the plane of the base. The expression for the temperature, $v$, is then as follows:

$$v = \frac{V}{2}\left[erf\frac{a-x}{2(kt)^{1/2}} + erf\frac{a+x}{2(kt)^{1/2}}\right]$$

where: $V$ initial temperature in probe fuel material.
$a$ height of probe fuel material piece or block.
$x$ distance from top of probe fuel piece.
$k$ thermal diffusivity of probe fuel material.
$t$ time variable.

If a sawtooth power pulse, as illustrated in FIG. 8, is assumed, which is a fair approximation of the actual pulse, the first time moment of power is the at seven-tenths of the pulse length. For a 0.1 sec. pulse length, the average time of heat drain would be 0.03 sec. For $x=0$ and $t=0.03$, the ratio of actual final temperature to the temperature with no heat loss, $v_{fl}/V_{fl}$ at the thermocouple junction, $x=0$, is as follows:

$$\frac{v_{fl}}{V_{fl}} = erf\frac{a}{2(kt)^{1/2}} = erf\, 1.8 = 0.99$$

The required dimension, $a$, is then, for a ratio of 0.99, as follows:

$$\frac{v_{fl}}{V_{fl}} = erf\frac{a}{2(kt)^{1/2}}$$

$a = 3.6(kt)^{1/2} = 3.6(0.343 \times 3 \times 10^{12}) = 0.370$ cm. $= 0.137$ in.

where:
$v_{fl}$ = final temperature at $x=0$.
$V_{fl}$ = temperature in probe fuel with no heat loss.
$a$ height of probe fuel material piece.
$k$ thermal diffusivity of probe fuel material.
$t$ = time variable.

The thermal analysis shows that temperature perturbation due to heat loss through the base is a more serious problem than heat loss through the TC leads or wires, thus a somewhat lower conducting probe fuel material than Zr-40 U alloy may provide a better compromise, and simply reducing the uranium content has been found to be beneficial from this standpoint. Another method of properly matching thermal impedance would consist of interposing a nonfissile metallic fuel of lower conductivity between the base and the fuel piece.

For application to SEFOR, the percentage by weight of uranium-235 in the probe fuel material can be derived from the expected rise in reactor fuel material, $\Delta V_{fo}$, which is 1,000° F. maximum and the desired rise in the probe fuel material (400° F.), wherein:

$E_{fo} = \Delta V_{fo} C_{fo}$ and $E_{fl} = \Delta V_{fl} C_{fl}$ then:

$$\frac{E_{fl}}{E_{fo}} = \frac{\Delta V_{fl} C_{fl}}{\Delta V_{fo} C_{fo}}$$

Since $E_{fl} = FGE_{fo}$ where: $E_{fo}$ = fission energy/g. of reactor fuel (57.8 w. sec./g.)

$\Delta V_{fo}$ = unperturbed temperature rise of reactor fuel during power pulse.
$C_{fo}$ = specific heat of reactor fuel (0.009 w./g.×°C.)
$E_{fl}$ = fission energy/g. of probe fuel material.
$\Delta V_{fl}$ = unperturbed temperature rise of probe fuel material during power pulse.
$C_{fl}$ = specific heat of probe fuel (0.057 w./g.×°C.)
$r$ = weight fraction of fissionable material in probe material.

$$G = \frac{\text{specific power of U-238}}{\text{specific power of SEFOR fuel}} = 1.08$$

is:

$$FGE_{fo} = E_{fo} \frac{\Delta V_{fl} C_{fl}}{\Delta V_{fo} C_{fo}},$$

$$F = \frac{1}{G} \frac{\Delta V_{fl} C_{fl}}{\Delta V_{fo} C_{fo}},$$

$$F = \frac{1}{1.08} \frac{(.400)(0.069)}{(1,000)(0.057)} \cong 0.40,$$

$E_f$=(0.4)(1.08)(57.8)=25.0 w.sec./g.

With the above choices of probe fuel material composition and dimensions, the steady state temperature rise, $\Delta V_{ss}$, can be calculated as:

$$\Delta V_{ss} = \frac{Qa^2}{2K}$$

where: $Q$ specific power of probe fuel at steady state (535 cm.³).
$a$ height of probe fuel material piece (0.370 cm.).
$K$ thermal conductivity of probe fuel (0.246 w./cm.×°C.).
is, $Q=Q_o 0.4(1.08)=(535)(0.4)(1.08)=231$ w./cm.³.
where: $Q_o$=535 watts/g. of reactor fuel at steady state.

thus, the temperature variable, $$T = \frac{(231)(.370)^2}{(2)(.246)} = 64° \text{ C.}$$

peak power, this might be as much as 150° C. due to peak-average ratio.

Chromel-alumel TC wires are used in the preferred embodiments of the inventive probe. These thermoelectric materials are recommended for the application because of their desirable metallurgical properties, large signal size and proven history of high tolerance to reactor conditions.

To minimize the perturbation of the thermocouple junction due to heat loss along the thermocouple leads, it is desirable to have high thermal conductivity and thermal capacity in the probe fuel material relative to the thermal couple leads. With oxide fuel, this is not as possible as for metallic fuel. While the thermal capacities of oxide fuel and thermocouple materials are comparable, the conductivity of chromel and alumel is about 10 times that of ceramic oxide as shown in the following table for approximate values at 1,000° F.

| | Specific heat, w./cm.°C. | Thermal conductivity, w./cm.°C. | Density | Thermal diffusivity |
|---|---|---|---|---|
| | .054 | .027 | 10.4 | .018 |
| ronel | .107 | .192 | 8.9 | |
| nicel | .125 | .207 | 8.9 | |
| ronel-Alumel average | .116 | .245 | 8.9 | .238 |
| -10% 1 | .069 | .216 | 10.4 | .343 |
| ced oxide fuel | .057 | | | |

A mathematical description of an approximate model of the TC junction interface, as shown in FIG. 9, can be formulated assuming an infinite composite geometry in which at time $t_o$, the temperature = o for $x<o$ and the temperature, $v$, for $x>0$. This is equivalent to the instantaneous release of a given amount of energy in the region $x<o$ at time zero. The temperature in the region $x<o$ is then:

$$v = \frac{K_1 k_1^{-1/2} V}{K_1 k_1^{-1/2} + K_2 k_2^{-1/2}} \text{ erfc} \frac{x}{2(K_2 t)^{1/2}}$$

where region II (see FIG. 9) represents the TC leads; and region I (see FIG. 9) represents the probe fuel material, and where: $K_1$ = conductivity of probe fuel material (0.246 w./cm.×°C.).
$k_1$ = diffusivity of probe fuel material (0.343 cm.²/sec).
$V$ initial temperature in probe fuel material.
$K_2$ = effective conductivity of thermocouple leads (0.00245 w./cm.×°F.).
$k_2$ = effective diffusivity of thermocouple leads.
$x$ = position variable (cm.).
$t$ time (sec.). Since the TC leads draw heat from a region of much greater diameter than their own, the region of leads can be taken as a region in which the density and heat capacity are reduced by an equal factor. This leaves the diffusivity unchanged, but reduces the conductivity. A 100-factor reduction will be assumed for 0.001-inch diameter TC wires. This is to say that a single lead draws heat from a region approximately 0.010-inch diameter.

The predicted temperature, $v$, at $x$=o at $t>o$ in the case of Zr-U probe fuel material is as follows:

$$v = \frac{K_1 k_1^{-1/2} V}{K_1 k_1^{-1/2} + K_2 k_2^{-1/2}}$$

$$= \frac{(.246)(.343)^{-1/2} V}{(.246)(.343)^{-1/2} + (.00245)(.238)^{-1/2}} = 0.99$$

In the case of $UO_2$ fuel material, the effective reduction in conductivity and mass of the wires is not as great since the volume of oxide fuel contributing to heating the TC leads is decreased due to its lower conductivity. An increase in the conductivity by a factor of 5 gives the temperature at the interface, $v^1$, at $t>o$ as follows (where region I is the fuel material):

$$v^1 = \frac{K_1 k_1^{-1/2} V}{K_1 k_1^{-1/2} + K_2 k_2^{-1/2}}$$

$$= \frac{(2.7 \times 10^{-2})(.046)^{-1/2} V}{(2.7 \times 10^{-2})(.046)^{-1/2} + (1.21 \times 10^{-2})(.236)^{-1/2}} = 0.80 V$$

It should be noticed that the temperature at $x$=o, the interface, is constant from time zero forward as would be expected for an infinite system.

The above prediction for metal fuels is substantiated by test results in a similar geometry, where the temperature at the earliest time reported (1 ms.) after a short power burst (60 $\mu$sec. half energy pulse width) was 0.94 of the final temperature.

Figure 10:
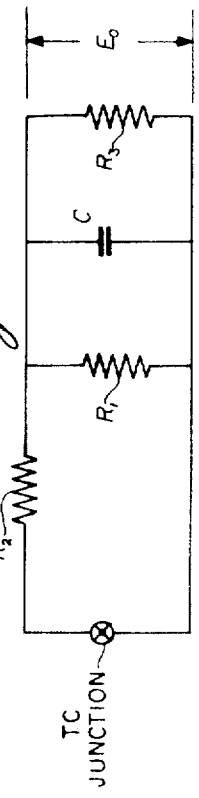
FIG. 10 is a schematic of a readout instrumentation circuit for the FIGS. 1 and 4 embodiments.

It is desirable to realize an overall system time constant of $10^{-4}$ sec (one-tenth the expected shortest pulse-rise time) as accomplished, for example, by the circuit illustrated in FIG. 10, wherein:
$R_1$ = cable insulation resistance
$R_2$ = cable conductor resistance
$R_3$ = input impedance of meter
$c$ cable capacitance
$E_o$ = output signal If the output, $E_o$, is read as a voltage across $R_3 C$, then the product of cable capacity, $C$, and lead resistance of the cable, $R_2$, must not be larger than $10^{-4}$ sec. The in-core cable from the detector to the fuel junction in SEFOR, for example, is about 20 feet, and the capacitance thereof may be as much as 40$\mu\mu$f/ft. Beyond this point, low-capacity cables can be used (10$\mu\mu$f/ft.), and about 200 feet of the latter cable is necessary. The total cable impedance then is about 2,000+800=2,800$\mu$ $\mu$f. The maximum value of the cable resistor is thus limited as follows:

$$R_2 C, R_2 = \frac{10^{-4}}{2.81 \times 10^{-9}} = 3.57 \times 10^4 \text{ ohms}$$

This value presents no problems as the actual value should not exceed 100 ohms. The input impedance, $R_3$, must be large ($\times$100) in comparison to the series resistance of the cable when at maximum sodium (reactor coolant) temperature of 1,300° F.

In order to obtain an accurate readout with the FIG. 10 exemplary circuit, the following relation must hold:
$R_3 > 100 R_2$      $R_3 > 10,000$ ohms
$R_1 > 100 R_2$, or $R_1 > 10,000$ ohms
$R_2 C = 10^{-4}$ sec      $R_2 < 3.57 \times 10^4$ ohms An alternate approach would be to use the cabling between the detector and readout as a transmission line. This would entail using the same impedance cable from detector to readout and terminating it with its characteristic impedance. While this approach minimizes the problem of low insulation resistance, it raises the problem of impedance matching and of minimizing the impedance of the small jumper wires required therefor which must be small in comparison to the impedance of the cable. Thus, a quartz fiber or similar insulation would be necessary to reduce the dielectric constant and, thus, increase the characteristic impedance of the cable.

For reactor installation of the inventive energy probes, the exact location would depend on the reactor construction, but the most probable location is in the instrumented fuel assemblies located in the reactor core. The tie rod, which is a hollow rod to which fuel rods are attached could be used as a holder with the probe projecting through the wall thereof. Also, some of the inlet thermocouple could be replaced by the energy probes.

It has thus been shown that the present invention provides a total-energy probe that monitors reactor power pulses and measures the transient power variations and evaluates the Doppler effect for controlling reactor stability. This is accomplished by mounting the fuel piece in contact with a heat sink so that the probe can measure the instantaneous total energy of pulses superimposed on a steady-state power level without incurring an excessive temperature rise in the fuel piece, and by using dimensions such that the heat drain from the region of the thermocouple junctions during the course of a short power pulse is negligible. In addition, one embodiment includes means to compensate for gamma radiation by adding a mass of material having the same gamma absorption characteristics of the fissionable material therein.

While particular embodiments of the invention have been illustrated and described, modifications will become apparent to those skilled in the art, and it is intended to cover in the appended claims all such modification as come within the spirit and scope of the invention.

I claim:

1. An energy probe for monitoring nuclear reactor power pulses generated in nuclear fuel-bearing material comprising: a housing adapted to be positioned in the coolant of an associated nuclear reactor core, a mass of material defining a heat sink fixedly mounted in said housing and defining a closed cavity therein, a body of fissionable material positioned in said cavity and in direct thermal contact at one end portion thereof with each of said heat sink and said housing, said fissionable material being of a type compatible with the fuel in an associated reactor core, and thermocouple means secured within said housing, said thermocouple means comprising a cable having at least a pair of conductors positioned in spaced relationship with respect to one another and with respect to said body of fissionable material, and having at least a pair of leads in contact with said conductors and at least one of said leads being in direct thermal contact with the opposite end portion of said body of fissionable material, said cable being supported in said housing such that said leads only support their own weight.

2. The energy probe defined in claim 1, additionally including a mass of gamma-absorbing material mounted in said cavity and isolated from said heat sink and said housing, said gamma absorbing material having the same gamma characteristics as said body of fissionable material to compensate for gamma radiation, and wherein one of said thermocouple leads is in contact with said mass of gamma-absorbing material, and additionally including wire means interconnecting said body of fissionable material and said mass of gamma-absorbing material.

3. The energy probe defined in claim 1, wherein said body of fissionable material is an alloy selected from the group consisting zirconium-uranium, molybdenum-uranium, and silicon-uranium.

4. The energy probe defined in claim 1, wherein said body of fissionable material is a metallic fuel alloy which undergoes no appreciable change in phase in the temperature range from about 1,100° F. to about 2,000° F.

5. The energy probe defined in claim 1, wherein said body of fissionable material is a metallic fuel alloy which undergoes no appreciable change in phase in the duration of a power pulse of about 100 milliseconds.

6. The energy probe defined in claim 1, wherein said heat sink is constructed from a thermal conductive material.

7. The energy probe defined in claim 1, wherein said thermocouple leads are constructed from chromel-alumel wires.

8. The energy probe defined in claim 1, wherein said leads of said thermocouple means are individually joined to said fissionable material such that said fissionable material forms a small link in a circuit of said thermocouple means.